(12) United States Patent
Louvel et al.

(10) Patent No.: US 7,532,494 B2
(45) Date of Patent: May 12, 2009

(54) POWER SUPPLY UNIT

(75) Inventors: Jean-Paul Louvel, Brigachtal (DE); Daniel Lopez, Villingen-Schwenningen (DE); Reinhard Kögel, Brigachtal (DE)

(73) Assignee: Thomson Licensing, Boulogne-Billancourt (FR)

( * ) Notice: Subject to any disclaimer, the term of this patent is extended or adjusted under 35 U.S.C. 154(b) by 148 days.

(21) Appl. No.: 11/136,646

(22) Filed: May 24, 2005

(65) Prior Publication Data

US 2006/0267565 A1  Nov. 30, 2006

(51) Int. Cl.
*H02M 7/217* (2006.01)
(52) U.S. Cl. .................. 363/89; 307/83; 348/E5.127
(58) Field of Classification Search .................. 363/89, 363/72, 71, 21.07, 21.04, 21.08, 97, 67, 69; 307/80, 83; 348/E5.127, 730; 323/207, 267
See application file for complete search history.

(56) References Cited

U.S. PATENT DOCUMENTS 5,905,491 A * 5/1999 Kim ........................ 345/212
5,910,891 A * 6/1999 Jo .............................. 363/89
5,920,466 A * 7/1999 Hirahara ................... 363/21.02
5,949,660 A * 9/1999 Rehm et al. ............... 363/21.07
6,005,781 A * 12/1999 Balakirshnan ............ 363/21.18
6,107,698 A * 8/2000 Ochiai et al. .................. 307/43
6,229,724 B1 5/2001 Virtanen

OTHER PUBLICATIONS

European Search Report for EP Application No. 05300353.9 dated Oct. 4, 2005.

* cited by examiner

*Primary Examiner*—Akm E Ullah
*Assistant Examiner*—Harry Behm
(74) *Attorney, Agent, or Firm*—Robert D. Shedd; Harvey D. Fried; James M. McKenzie

(57) ABSTRACT

Embodiments of the invention provide a power supply unit that operates in a standby mode and in a normal mode. The power supply unit comprises a first power supply providing output voltages during the standby mode and a second power supply providing output voltages during the normal mode. A pre-converter provides a stabilized supply voltage for the first and second power supply. The pre-converter operates as an up-converter during the normal operation mode and is switched off during the standby mode together with the second power supply.

2 Claims, 2 Drawing Sheets

_US 7,532,494 B2_

POWER SUPPLY UNIT

FIELD OF THE INVENTION

The present invention relates to power supplies for providing regulated output voltages.

BACKGROUND

In digital consumer electronics appliances a large number of stabilized DC supply voltages are needed, for example in large screen television sets. There exists therefore a demand for a respective power supply that is cost efficient and has a high efficiency in the standby operation mode as well as in the normal operation mode.

SUMMARY OF THE INVENTION

A power supply unit according to an embodiment of the invention comprises a first power supply and a second power supply. The first power supply provides a first output voltage during a standby operation mode. The second power supply provides a second output voltage during a normal operation mode. The power supply further comprises a pre-converter operating as an up-converter for providing a first stabilized supply voltage for the operation of the first and second power supply. The pre-converter is switched on and off together with the second power supply by a secondary side control voltage. The secondary side control voltage is coupled to the primary side of the power supply unit via a coupling means.

BRIEF DESCRIPTION OF THE DRAWINGS

Embodiments of the invention are explained in more detail with regard to schematic drawings, in which.

DETAILED DESCRIPTION OF THE DRAWINGS

Figure 1A:
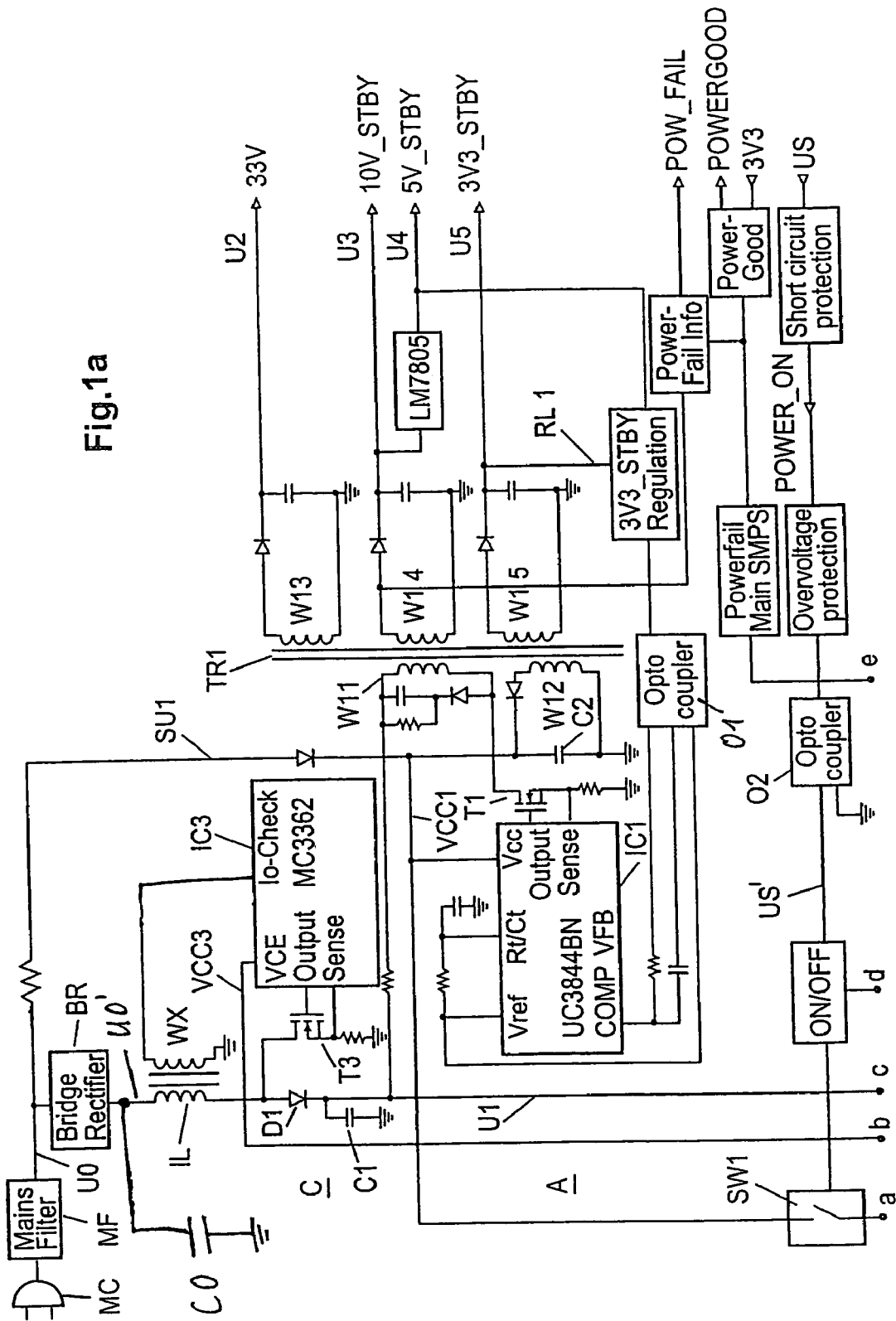
FIG. 1a is a schematic diagram of a power supply according to one embodiment of the invention.

It conventional to use power supply units having a standby operation mode and a normal operation mode for consumer electronics appliances, in particular, when the appliance is controllable via a remote control. In the standby mode, most of the circuits of the appliance are switched off, and only a remote control receiver and a micro-controller are operating, for allowing a user to switch between standby and normal operation via the remote control. For cost reasons, in the standby mode the power consumption should be as low as possible, whereas in the normal operation mode the power supply unit has to provide full power with a high efficiency for the operation of the appliance.

Several circuit designs are known to provide a power supply unit with a very low power consumption in standby mode. For example a switched mode power supply may be used which operates in a burst mode during standby mode. A further possibility is to use a switched mode power supply for the normal mode operation and a second power supply, in particular also a switched mode power supply, for the operation in the standby mode. With this circuit design, the switched mode power supply for normal operation can be switched-off completely during the standby operation.

From power factor correction circuits, pre-converters comprising an integrated controller circuit are known. These typically operate as a switching up-converters. Integrated circuits of this kind are for example the circuit MC33260, manufactured by On Semiconductor, and the circuit L6562 manufactured by ST Microelectronics. Upconverter power supplies of this kind usually comprise a regulation loop for providing a constant output voltage.

In several countries it is already required to equip switched mode power supplies above a defined power consumption with a power factor correction (PFC), for reducing the low frequency harmonic content of the waveform of the mains input voltage to a permissible value. Known solutions use for example a mains frequency coil with a high inductivity for providing a power factor correction. Another solution employs an active power factor correction circuit, as described before.

A switched mode power supply with a transformer, which comprises a secondary winding for providing a supply voltage in a forward mode is disclosed for example in WO-A-03/071792. The switched mode power supply of this reference operates as a flyback converter, which regulates an output voltage provided by a flyback secondary winding. The supply voltage of a secondary winding operating in the forward mode is therefore unregulated, and is in particular dependent on the mains voltage. Unregulated supply voltages may be used for example for circuits, which need an adjustable supply voltage, for which a DC-DC converter is required in addition, or for circuits, for which a regulated DC-supply voltage is not necessary.

When using a flyback converter power supply with an additional secondary winding operating in a forward mode, the size of the core of the transformer has not to be increased, because the flyback secondary winding uses only the time interval for energy transmission, in which the switching transistor is blocking. The forward secondary winding uses the time interval for energy transmission, when the switching transistor is conducting.

Embodiments of the invention provide a power supply unit that operates in a low power standby mode and in a high power normal mode and is designed in particular for use within a consumer electronics appliance, for example a rear-projection television set.

The power supply unit comprises in a further aspect of the invention a first switch with a control input, which is coupled to the coupling means for switching the second power supply on and off via the secondary side control voltage. The second power supply is in particular a switched mode power supply and the switch provides a second supply voltage from the first power supply to a driver stage of the second power supply for switching the driver stage on and off. The pre-converter is switched on and off via a third supply voltage provided by the second power supply or via the second supply voltage as provided by the switch.

The first and the second power supply of the power supply unit are in particular both switched mode power supplies, for providing a high power conversion efficiency. During the standby mode, the second power supply and the pre-converter are both switched off, for providing a low power consumption the standby mode. The pre-converter operates in one embodiment as an up-converter and comprises a regulation loop for generating the first stabilized supply voltage.

The power supply unit is suitable for use within a consumer electronics appliance, which operates in a standby mode and in a normal mode, for example a rear-projection television set comprising a digital light processing (DLP) unit. The stabilized supply voltage from the pre-converter is used in this embodiment advantageously for the operation of the digital light processing unit. Further, the second power supply is in particular a switched mode power supply comprising a transformer with a secondary winding operating in a forward mode for providing a stable DC supply voltage for an audio amplifier of the television set.

The second power supply, the pre-converter and the digital light processing unit are therefore switched off during stand-by mode in an easy manner via one secondary side control voltage, for providing a low power consumption during stand-by mode. The stabilized supply voltage from the pre-converter can be utilized further for providing stabilized output voltages being generated by secondary windings of a transformer of a switched-mode power supply, the secondary windings operating in a forward mode.

Via a capacitor arranged in front of the pre-converter two operating modes are selectable. When the capacity value of the capacitor is low, the capacitor is used as a filtering capacitor for high frequency signals and the pre-converter operates as an active power factor correction circuit. When the capacity of the capacitor is high, the capacitor provides a smoothed DC input voltage for the pre-converter.

The pre-converter operates then as a conventional step-up converter with high efficiency for providing for example a voltage conversion from 110 Volts AC to 350-400 Volts DC. Embodiments of the power supply unit are suitable for use in particular within a television set operating with a US 110 Volts mains voltage without power factor correction, and by only changing the capacitor, the power supply unit operates with a European 220 Volts mains voltage, and providing a power factor correction, as necessary in several European countries.

Figure 1B:
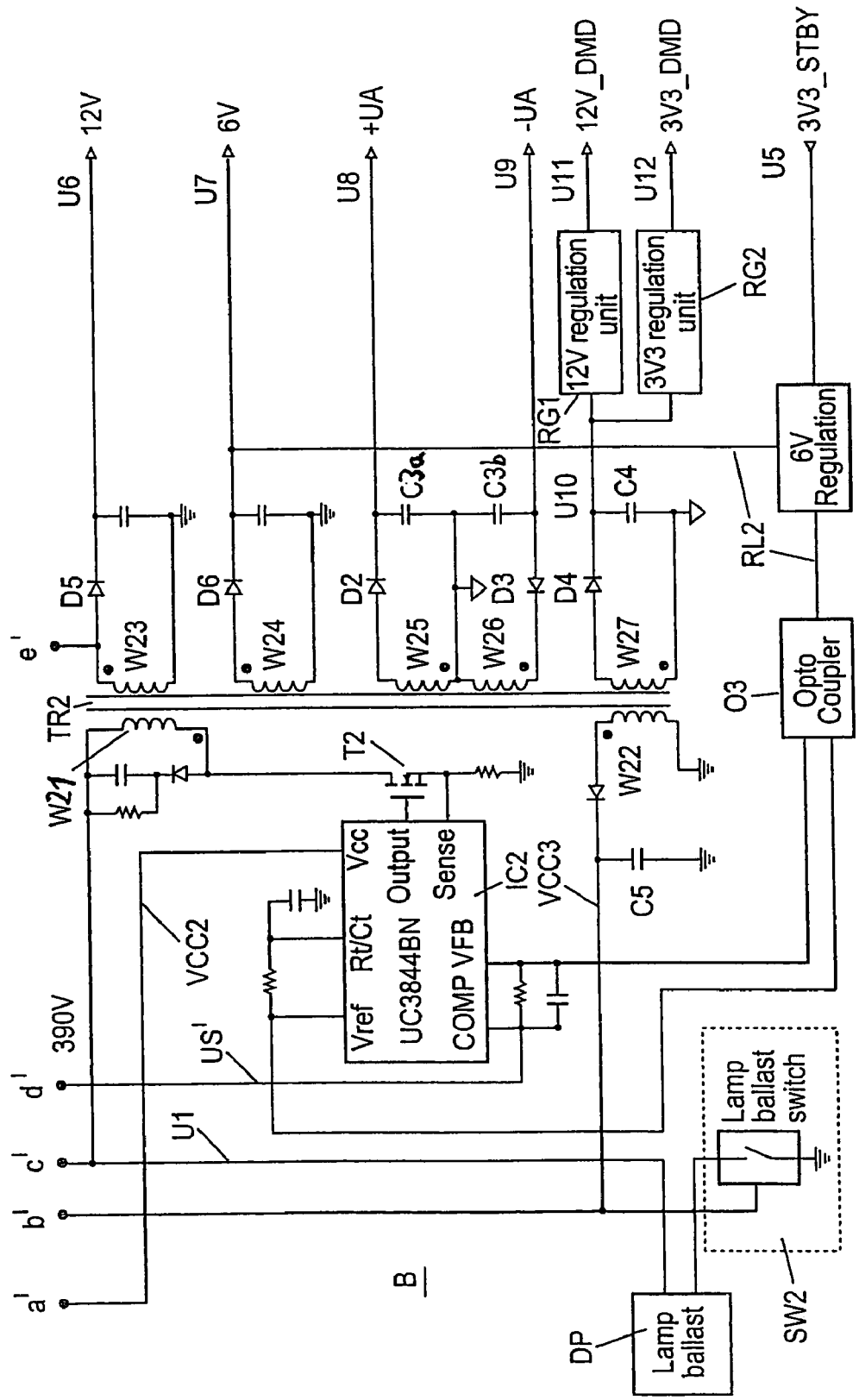
FIG. 1b is a schematic diagram illustrating a power supply according to one embodiment of the invention.

In the FIGS. 1a and 1b a power supply unit is shown comprising a first power supply A, a second power supply B and a pre-converter C, for providing regulated DC output voltages U2-U10. The power supply unit is divided into two parts as shown in the figures, which are connected via terminals a-e shown in FIG. 1a and terminals a'-e' shown in FIG. 1b.

The input part of the power supply unit is shown in FIG. 1a and comprises a bridge rectifier BR coupled to an input voltage U0. The input voltage U0 is provided via a mains connection MC and a mains filter MF from mains. The bridge rectifier BR generates a rectified voltage U0', which is smoothed by a capacitor C0 and coupled to a first terminal of an inductivity IL, for example a coil or a transformer, of the pre-converter C.

The pre-converter C comprises further a switching transistor T3 and a rectifying diode D1, both coupled to a second terminal of the inductivity IL, for providing a first DC supply voltage U1. The voltage U1 is smoothed by a capacitor C1. The capacity of the capacitors C0 and C1 is for example 250 µF.

The switching transistor T3 is controlled in this embodiment by an integrated control circuit IC3, for providing a stabilization of the supply voltage U1. In this embodiment, the controller circuit IC3 is an integrated circuit MC33262, manufactured by On-Semiconductor. This integrated circuit is particular used as an up-converter power supply providing active power factor correction, and respective applications are shown in the corresponding datasheet of the manufacturer. But the embodiment as described operates as an up-converter power supply without a power factor correction for the power supply unit because of the high capacity value of the capacitor C0. For a power factor correction, the capacity of the capacitor C0 has to be about 1 µF, or at least less than 10 µF.

The controller circuit IC3 is sensitive to the rectified mains input voltage U0' via an auxiliary winding WX of the inductor IL and comprises in particular a regulation loop coupled to the supply voltage U1, not shown, for stabilizing the voltage U1. The design of such a regulation loop known from prior art and described for example in respective datasheets.

The voltage U1 is coupled to a primary winding W11 of a transformer TR1 of the first power supply A. The power supply A is in this embodiment a switched mode power supply comprising a switching transistor T1 coupled in series to the primary winding W11. The transformer TR1 comprises secondary windings W13, W14, W15 located on the secondary side of the power supply A, for providing stabilized output voltages U2-U5. The transformer TR1 comprises further a secondary winding W12 located at the primary side of the power supply A for providing a second supply voltage VCC1 during operation of the power supply A. The supply voltage VCC1 is coupled to an integrated circuit IC1, which is arranged for the operation of the switching transistor T1. The integrated circuit IC1 is a known circuit UC3844. The supply voltage VCC1 is a DC voltage smoothed by a capacitor C2.

The power supply A comprises a regulation loop RL1 coupled to the output voltage U5, for providing a feedback signal via an opto-coupler O1 to a feedback input VFB of the control circuit IC1. The power supply A operates as a flyback converter, and via the regulation loop RL1 also the other output voltages U2-U4 are regulated. The power supply A comprises further a start-up circuit SU1 coupled to the input-voltage U0, or to supply voltage U1 in another embodiment, for providing a start up voltage for the control circuit IC1, when the power supply unit is switched on. A switched mode power supply of this kind is known from prior art and design details for the operation are described for example in datasheets of IC manufacturers. The supply voltage U1 of the pre-converter C is further coupled to the power supply B, a second switched mode power supply, as shown in FIG. 1b. The power supply B comprises a transformer TR2 with a primary winding W21, to which the voltage U1 is coupled. The transformer TR2 comprises further secondary windings W23-W27, for providing output voltages U6-U10, and a secondary winding W22 located on the primary side of the power supply B, for providing a third supply voltage VCC3. To the primary winding W21 a switching transistor T2 is coupled, which is operated by an integrated control circuit IC2. The control circuit IC2 is in this embodiment also an integrated circuit UC3844. A feedback signal is coupled via a regulation loop RL2 comprising an opto-coupler O3 to a feedback input VFB of the control circuit IC2, for providing a stabilization of the output voltage U7. The power supply B can be switched on and off via a first switch SW1, shown in FIG. 1a, which switches on and off the supply voltage VCC1 for providing a supply voltage VCC2 for the controller circuit IC2.

The operation of the power supply unit is as follows: when the power supply is switched on, the filtered mains voltage U0 is provided and the first power supply A starts operating, because the voltage U0 is applied via the inductor IL and the diode D1 to the primary winding W11 of the transformer TR1. Also the supply voltage VCC1 is generated via the start up circuit SU1.

When the voltage VCC1 is applied to the terminal VCC, the control circuit IC1 starts operating, subsequently generating the output voltages U2-U5. The voltage U5 in particular is provided for a micro-processor of a respective appliance, in which the power supply unit is arranged. The micro-processor, not shown, allows to switch between the standby mode operation and the normal mode operation of the appliance.

For the normal operation mode, the micro-processor provides a control signal US, which is coupled via a coupling means, an opto-coupler O2 in this embodiment, as a-control signal US' to the switch SW1. For the normal operation, the switch SW1 is switched through, providing therefore the supply voltage VCC2, which is derived from the supply voltage VCC1, for the controller circuit IC2, FIG. 1b. The power supply B therefore starts operating, when the switch SW1 is closed. When no control signal US' is applied to the switch SW1, the switch is open.

When the output voltages U6-U10 are established, also the supply voltage VCC3 is generated via the winding W22, which is used for the operation of the pre-converter C. The voltage VCC3 is applied to a VCC input of the controller circuit IC3, which subsequently starts operating.

The pre-converter C is therefore switched off during standby mode together with the second power supply B according to the invention. This is performed by one secondary side control voltage, voltage US., which is coupled via the coupling means, opto-coupler OK, to the primary side. In this embodiment, the supply voltage VCC3 for the operation of the pre-converter C is supplied by the power supply B, which is switched off in standby mode. When the capacitor C5 providing the supply voltage VCC3 is discharged to a low voltage level, after the power supply B is switched off, the controller circuit IC3 stops operating.

The power consumption is therefore reduced in standby mode, because the pre-converter and the power supply B are switched off. The pre-converter C is transparent for the input voltage U0' and the operation of the standby mode power supply A is therefore not affected when the pre-converter C is switched off.

In another embodiment, not shown, the supply voltage VCC3 is provided via the switch SW1, for deriving the supply voltage VCC3 also from the supply voltage VCC1 of the power supply A. Then, when the switch SW1 is closed, the power supply B and the pre-converter C start operating at the same time. Further, the control voltage US' may be coupled in addition to a comparator terminal COMP of the controller circuit IC2. This allows switching off the power supply B and the pre-converter C at the same time.

The power supply unit is in particular applicable for use within a television set, which operates in a normal operation mode and a standby operation mode. The power supply as shown in FIGS. 1a and 1b is used for example within a rear-projection television set, which uses a digital light processing unit DP comprising a digital micro-mirror device (DLP) for the display of the television picture. The power supply unit comprises for this application in addition a second switch SW2 for switching through the supply voltage U1 to the light processing unit DP.

Currently used DLP units need in particular a stabilized DC voltage within a voltage range of 350-400 Volts, which is advantageously provided directly by the pre-converter C, which output voltage U1 can be adjusted to the required operating voltage of the DLP unit DP. During standby mode, the DLP unit is switched off via the switch SW2, for reducing the power consumption of the DLP unit in the standby mode to zero. In one embodiment, the power consumption in standby mode of the complete set is only about 2.5 Watts. The voltage U1 provided by the pre-converter C is in this embodiment 390 Volts, which can be adjusted by using respective resistor values within the regulation loop of the pre-converter C, as known for a person skilled in the art.

For the digital mirror device of the DLP unit DP in addition supply voltages U11 and U12 are generated via regulation units RG1, RG2 from the output voltage U10. The voltage U10 is generated by the secondary winding W27 in a forward mode, in which the energy is transferred to the secondary winding W27, when the switching transistor T2 is conducting. In this mode, the voltage U10 depends essentially on the voltage across the winding W21 and the winding ratio of the windings W21 and W27.

Also the output voltages U8 and U9 are generated in the forward mode. The diodes D2-D4 are therefore conducting for charging the capacitors C3a, C3b and C4, when the switching transistor T2 is conducting. Because the input voltage U1 of the primary winding W21 of the transformer TR2 is stabilized, the output voltages U8-U10 are stabilized accordingly. The voltages U8, U9 are used in particular for an audio power amplifier, which can have high load changes during operation.

The output voltage U7 is regulated in a flyback mode via the regulating loop RL2, and the output voltage U6, which is provided by the secondary winding W23 via a diode D5 also during flyback, is therefore also stabilized. The voltage polarities at the windings of the transformer TR2 are denoted by black dots, which illustrate same voltage polarities at the terminals at the same time.

When using secondary windings W25-W27 operating in the forward mode, the size of the transformer TR2 can be kept comparatively small, because the core of the transformer TR2 has to be designed essentially with respect to the power transferred to the windings W23, W24 during flyback operation. Only the higher current through the switching transistor T2 has to be taken into account, when the transistor T2 is conducting, which depends now in addition on the load coupled to the windings W25, W26 and W27.

The power supply unit is therefore suitable to be constructed as a compact and cost efficient module, which comprises a standby mode with low power consumption, and which is suitable to be used in particular for rear projection television displays.

For one embodiment of the invention, power supply A comprises a linear, non-switching power supply. In one embodiment the circuit design for the pre-converter corresponds to circuit designs suggested by IC manufacturers for providing a power factor correction. However, in some cases the power factor is so low because of the high value of the capacitor C0, that power factor regulations may not be fulfilled.

The present invention is not limited to the embodiments as described above and various available modifications become possible for those skilled in the art without departing from the scope of the invention.

The invention claimed is:

1. A projection television including a power supply unit having a standby operation mode and a normal operation mode, comprising:
    a first power supply providing a first output voltage during said standby mode;
    a second power supply providing a second output voltage during said normal operation mode;
    a pre-converter operating as an up-converter during said normal operation mode and being switched-off during said standby mode, said pre-converter providing a first stabilized supply voltage for said first and second power supply;
    a coupling means for switching on and off said pre-converter together with said second power supply via a secondary side control voltage;
    a digital light processing unit coupled to said first stabilized supply voltage;
    a first switch coupled with a control input to said coupling means, said first switch being coupled with a current input to a second supply voltage provided by said first power supply and being coupled with a current output to said second power supply for switching said pre-converter and said second power supply on and off by switching said second supply voltage on and off; and, a second switch coupled with a control input to a third supply voltage being a DC supply voltage provided by said second power supply for switching through said first stabilized supply voltage to said digital light processing unit, the second switch switching said digital light processing unit on and off together with said pre-converter and said second power supply.

2. The projection television of claim 1, wherein said first stabilized supply voltage is within a voltage range of 350 to 400 Volts.

* * * * *